United States Patent
Sato

(10) Patent No.: US 8,182,124 B2
(45) Date of Patent: May 22, 2012

(54) DOOR MIRROR INCORPORATING A LAMP

(75) Inventor: Yasuhiro Sato, Fujieda (JP)

(73) Assignee: Murakami Corporation, Shizuoka-shi (JP)

( * ) Notice: Subject to any disclaimer, the term of this patent is extended or adjusted under 35 U.S.C. 154(b) by 335 days.

(21) Appl. No.: 12/445,345

(22) PCT Filed: Jun. 4, 2007

(86) PCT No.: PCT/JP2007/061268
§ 371 (c)(1),
(2), (4) Date: Jun. 3, 2009

(87) PCT Pub. No.: WO2008/044362
PCT Pub. Date: Apr. 17, 2008

(65) Prior Publication Data
US 2010/0073949 A1    Mar. 25, 2010

(30) Foreign Application Priority Data
Oct. 13, 2006   (JP) ............................. P2006-280301

(51) Int. Cl.
*B60Q 1/32* (2006.01)
*B60R 1/12* (2006.01)
*F21V 19/00* (2006.01)
*H01R 33/00* (2006.01)

(52) U.S. Cl. ......... 362/494; 362/135; 362/548; 362/656

(58) Field of Classification Search .................. 362/494, 362/135, 142–144, 548, 655, 656
See application file for complete search history.

(56) References Cited

U.S. PATENT DOCUMENTS

| | | | | | |
|---|---|---|---|---|---|
| 2,117,760 | A | * | 5/1938 | Douglas | 362/548 |
| 5,499,169 | A | * | 3/1996 | Chen | 362/494 |
| 5,607,218 | A | * | 3/1997 | Choji | 362/548 |
| 6,027,236 | A | * | 2/2000 | McDonnell | 362/510 |
| 6,074,077 | A | | 6/2000 | Pastrick et al. | |

(Continued)

FOREIGN PATENT DOCUMENTS

CN          1197740 A          11/1998

(Continued)

OTHER PUBLICATIONS

Office Action issued Sep. 27, 2010, in Chinese Patent Application No. 200780030092.6.

(Continued)

*Primary Examiner* — Alan Cariaso
(74) *Attorney, Agent, or Firm* — Oblon, Spivak, McClelland, Maier & Neustadt, L.L.P.

(57) ABSTRACT

Light of an incorporated lamp illuminates the lower side of a side surface of a door of a vehicle. A rear end part of a lamp socket mounted with the lamp is exposed from a cylinder part of a lamp housing and projected from the lamp housing toward a holder/mirror assembly. Therefore, when replacing the lamp, the lamp socket can be found easily by simply removing the holder/mirror assembly, and the lamp can easily be extracted along with the lamp socket, to an operator side. Also, when attaching the lamp socket, high visibility of an opening part can be obtained because the opening part of the cylinder part is exposed to the holder/mirror assembly side in the lamp housing, thereby achieving a door mirror with extremely good workability of lamp replacement.

13 Claims, 8 Drawing Sheets

U.S. PATENT DOCUMENTS

| | | | |
|---|---|---|---|
| 6,299,333 | B1 | 10/2001 | Pastrick et al. |
| 6,926,432 | B2 * | 8/2005 | Rodriguez Barros et al. .............................. 362/494 |

FOREIGN PATENT DOCUMENTS

| | | |
|---|---|---|
| CN | 2415978 Y | 1/2001 |
| DE | 102 20 511 A1 | 11/2003 |
| EP | 0 873 910 A2 | 10/1998 |
| EP | 0 873 910 A3 | 10/1998 |
| JP | 56 107609 | 8/1981 |
| JP | 58-188733 | 11/1983 |
| JP | 62 40706 | 3/1987 |
| JP | 4 135841 | 12/1992 |
| JP | 6 61586 | 8/1994 |
| JP | 2000-043641 | 2/2000 |
| JP | 2001-206138 | 7/2001 |
| JP | 2001 294081 | 10/2001 |
| JP | 2002 96682 | 4/2002 |
| JP | 2002 96683 | 4/2002 |

OTHER PUBLICATIONS

U.S. Appl. No. 12/447,483, filed Apr. 28, 2009, Sato.
Office Action issued on Jun. 21, 2011 in the corresponding Japanese Application No. P2006-280301 (with English Translation).
Office Action dated Jan. 31, 2012 issued in Japanese Patent Application No. 2006-280301.

* cited by examiner

DOOR MIRROR INCORPORATING A LAMP

TECHNICAL FIELD

The present invention relates to a door mirror incorporating a lamp.

BACKGROUND ART

There is known a technology for illuminating the lower side of a side surface of a door of a vehicle by means of a lamp incorporated in a door mirror (see Patent Literatures 1 to 4). The lamp employs a luminous filament, and the normal life span of the filament itself is approximately several hundreds to 1000 hours. A lamp reaching the end of its life causes a lighting failure generated by filament breakage. It is assumed that the lamp reaches the end of its life during a long duration of use of the lamp in a vehicle, in which case the lamp needs to be replaced. Particularly, the life of the lamp tends to be shortened by vibration or shock of a moving vehicle, which increases the need for lamp replacement.

Patent Literature 1: Japanese Patent Application Publication No. 2001-294081.
Patent Literature 2: Japanese Patent Application Publication No. 2002-96683.
Patent Literature 3: U.S. Pat. No. 6,074,077.
Patent Literature 4: U.S. Pat. No. 6,299,333.

DISCLOSURE OF THE INVENTION

Problem to be Solved by the Invention

However, in the case of a conventional door mirror, a lamp is embedded in the back of a door mirror body, and therefore it is difficult to find the lamp itself when replacing the lamp. Moreover, the inside of the door mirror body needs to be disassembled in order to replace the lamp, which makes the replacement work complicated.

An object of the present invention is to provide a door mirror in which a lamp can be replaced easily.

Means for Solving the Problem

The present invention is a door mirror fixed to a door of a vehicle and incorporating a lamp, the door mirror having: a door mirror body fixed to the door and having an opening; a mirror part detachably attached to close the opening; a lamp housing provided within the door mirror body; a lamp window provided in the door mirror body and emitting light of the lamp; a lamp attachment opening part formed on the mirror part side of the lamp housing and exposed to the mirror part side; and a lamp socket mounted in a rear part of the lamp and made detachable with respect to the lamp housing, wherein a leading end part of the lamp socket has a lamp insertion port through which the lamp can be attached, and a rear end part of the lamp socket is exposed from the lamp attachment opening part and projected from the lamp housing toward the mirror part.

According to the door mirror of the present invention, the lamp is incorporated therein, and the lamp window emits light of the lamp to illuminate the lower side of a side surface of the door of the vehicle when boarding the vehicle. The rear end part of the lamp socket is exposed from the lamp attachment opening part and projected from the lamp housing toward the mirror part. Therefore, when replacing the lamp, the lamp socket can be found easily by simply removing the mirror part, and the lamp can easily be extracted along with the lamp socket, to an operator side. Also, when attaching the lamp, high visibility of the lamp attachment opening part can be obtained because the lamp attachment opening part is exposed to the mirror part side, thereby achieving the door mirror with extremely good workability of lamp replacement. Because the disassembly and reassembly performed when replacing the lamp can be minimized, parts other than the object of replacement are less likely to be damaged at the time of disassembly and reassembly, and changes in the appearance configuration are also less likely to be caused after the reassembly. In addition, due to the simple lamp replacement, the range of options to choose lamps is expanded, i.e., a highly luminous lamp can be selected easily, for example.

Preferably, the door mirror according to the present invention further has a partition plate disposed between the mirror part and the lamp housing, and a socket observation window which is formed on the partition plate and through which the lamp socket can be inserted, wherein the socket observation window is formed in a size that allows the insertion of at least two fingers thereto in order to hold the rear end part of the lamp socket with the fingers to remove the lamp socket. Even in the door mirror having the partition plate, the lamp socket can be seen easily, and therefore the rear end part of the lamp socket can be held and extracted easily with the fingers to replace the lamp easily.

Furthermore, preferably, a cylinder part having the lamp attachment opening part is formed in the lamp housing, a flange part covering the cylinder part from the outside is formed in the lamp socket, and the lamp socket is mounted in the lamp housing by recess-and-projection fitting between an inner surface of the flange part and an outer surface of the cylinder part. Because the lamp socket is mounted in the lamp housing by recess-and-projection fitting between the inner surface of the flange part and the outer surface of the cylinder part, the lamp socket is made detachable with respect to the lamp housing. It is not necessary to either hold the lamp socket by using a spring or consider a decrease in the holding force, for example. Moreover, because the flange part covers the cylinder part from the outside, the entry of water into the lamp housing via the lamp attachment opening part can be prevented.

Effects of the Invention

According to the present invention, the lamp incorporated in the door mirror can be replaced easily.

EXPLANATION OF REFERENCE NUMERALS

Figure 1:
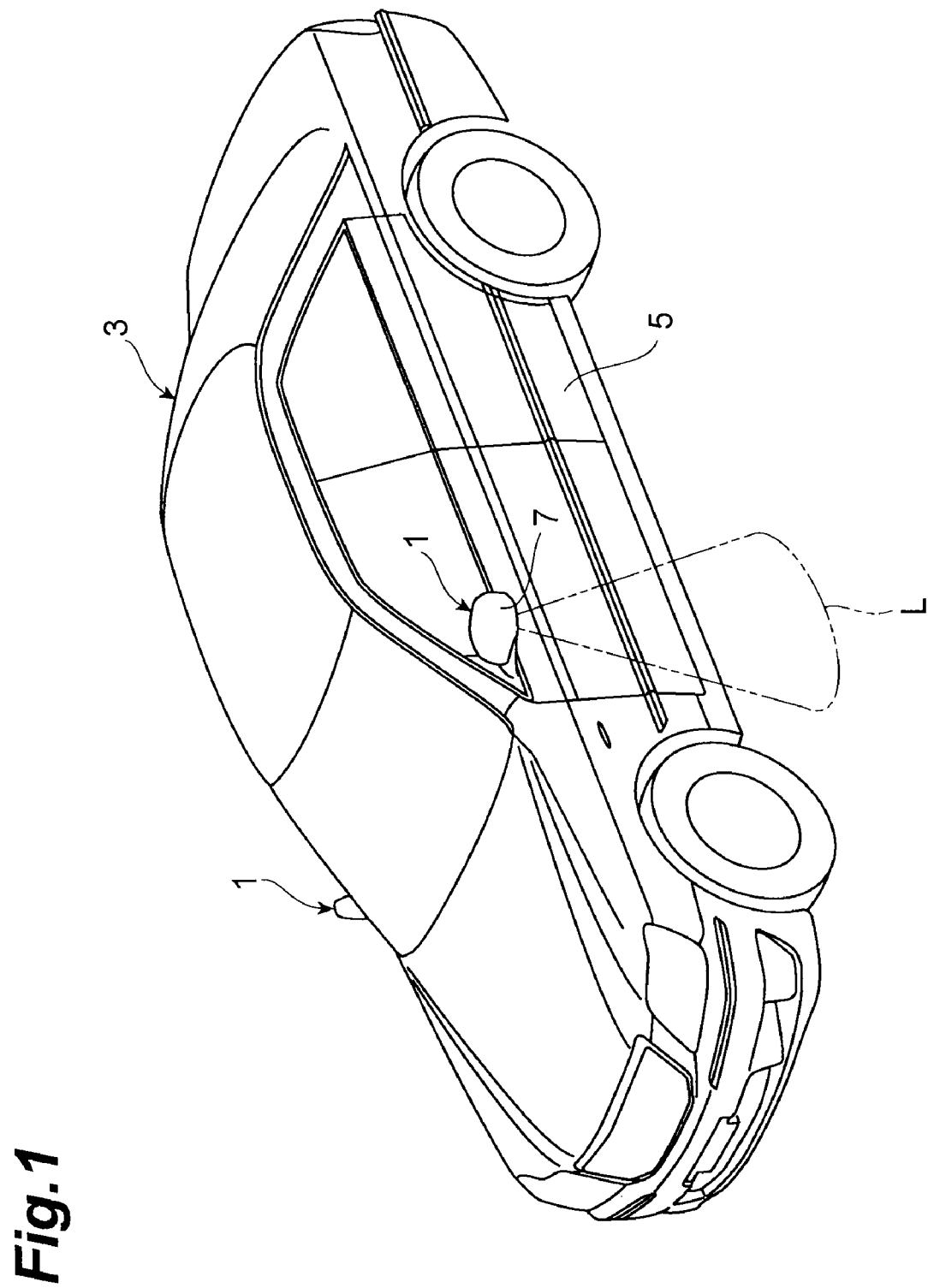
FIG. 1 is a perspective view of a vehicle having a door mirror according to the present invention.

1 . . . Door mirror
3 . . . Vehicle
5 . . . Door
7 . . . Door mirror body
7a . . . Opening
13 . . . Partition plate
15 . . . Holder/mirror assembly (mirror part)
33 . . . Lamp housing
33b . . . Cylinder part
33c . . . Lamp attachment opening part
33f . . . Outer surface of cylinder part
35 . . . Lamp
37 . . . Lamp socket
37b . . . Insertion port
37h . . . Flange part
37i . . . Inner surface of flange part
37j . . . Rear end part
39 . . . Socket observation window
43 . . . Lamp window

BEST MODES FOR CARRYING OUT THE INVENTION

Preferred embodiments of the door mirror according to the present invention are now described hereinafter in detail with reference to the drawings.

Figure 2:
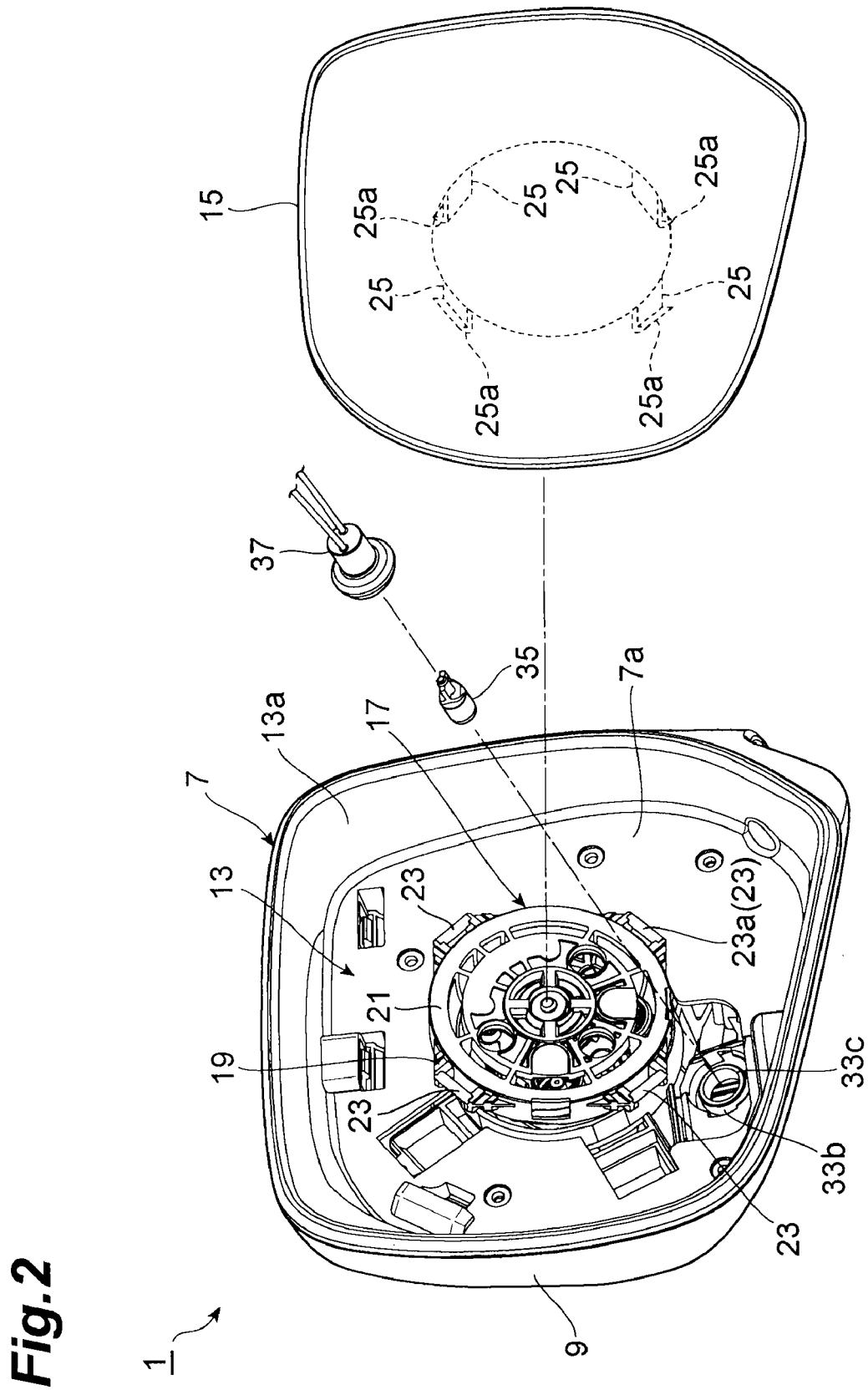
FIG. 2 is an exploded perspective view showing an embodiment of the door mirror according to the present invention.

As shown in FIGS. 1 and 2, a door mirror 1 is fixed to a door 5 of a vehicle 3 and has a door mirror body 7 made of resin. This cup-shaped door mirror body 7 has a casing 9 that has an opening 9a (see FIG. 4) fixed to the door 5 and opened to a rear part side of the vehicle 3, and a cup-shaped partition plate 13 fitted and fixed to the opening 9a of the casing 9.

Figure 3:
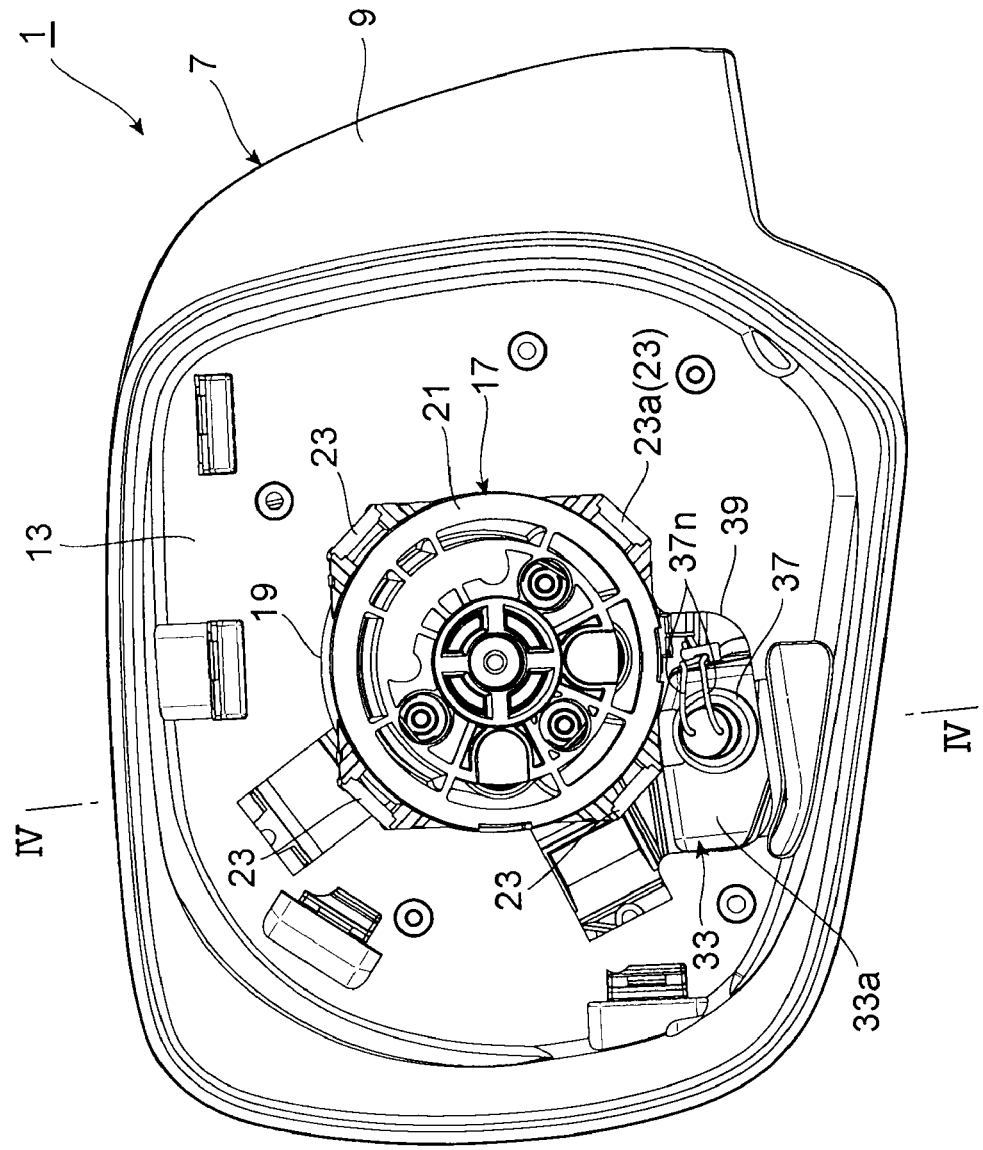
FIG. 3 is a front view of the door mirror according to the present invention.

As shown in FIGS. 2 and 3, a plate-like holder/mirror assembly (mirror part) 15 is disposed to close a concave part 13a of the partition plate 13, that is, an opening 7a of the door mirror body 7. An opening part 19 for exposing a pivot plate 17 is formed in the center of the partition plate 13.

The pivot plate 17 has a circular plate part 21 abutted on a back surface of the holder/mirror assembly 15 and four retaining parts 23 provided at an outer circumferential end of the circular plate part 21. Each of the retaining parts 23 is in an U-shape and has a rod-like locking part 23a. On the other hand, four pawl pieces 25 made of resin are provided on the back surface of the holder/mirror assembly 15. A leading end of each of the pawl pieces 25 is provided with a hook part 25a. Hooking the hook part 25a of the holder/mirror assembly 15 to the locking part 23a of the retaining part 23 can detachably mount the holder/mirror assembly 15 to the pivot plate 17, and strongly pulling the holder/mirror assembly 15 can release the holder/mirror assembly 15 from the pivot plate 17.

Figure 4:
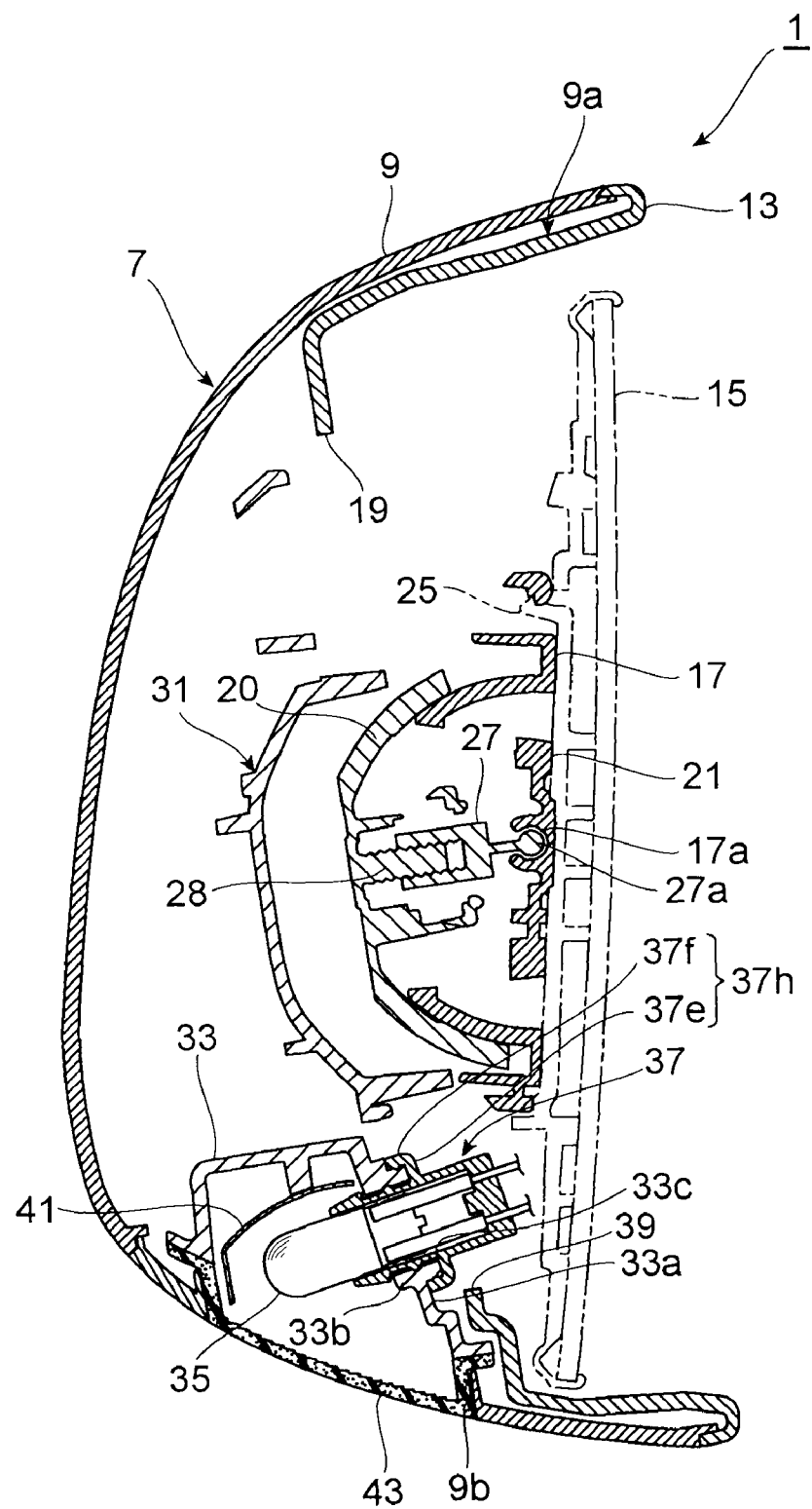
FIG. 4 is an end view taken along line IV-IV of FIG. 3.

As shown in FIGS. 3 and 4, two spherical concave parts 17a are formed on a back surface of the pivot plate 17. Spherical head parts 27a of adjuster nuts 27 are coupled to the concave parts 17a, respectively, by a ball joint structure. The adjuster nuts 27 are screwed into two adjust bolts 28 that are arranged in a cup-shaped holding part 20 in a standing manner, and are moved in an axial direction independently while rotating by means of an actuator (not shown) having a combination of a motor and a gear. The inclination angle of the pivot plate 17 can be changed by changes in the amount of independent movement of each adjuster nut 27. As a result, the mirror specular angle of the holder/mirror assembly 15 can be changed to a predetermined mirror specular angle.

The actuator and the holding part 20 are fixed to an internal frame 31 disposed within the casing 9. A lamp housing 33 is formed in a lower part of the internal frame 31. A front wall (the surface on the holder/mirror assembly 15 side) 33a provided in the lamp housing is provided with a lamp attachment opening part 33c for communicating the inside and outside of the lamp housing 33, and this opening part 33c is formed at an outer end of a cylinder part 33b projecting to the holder/mirror assembly 15 side. A lamp 35 is inserted from the opening part 33c of the cylinder part 33b, and a lamp socket 37 attached to a rear part of the lamp 35 is mounted in the cylinder part 33b. Note that the lamp may be not only the one commonly called "bulb" but also an LED or a fluorescent tube.

As shown in FIGS. 5 to 8, the inside of a lamp main body part 35a of the lamp 35 is provided with a filament. A rear end part of the lamp main body part 35a is provided with a wedge base part 35b, and a pair of conduction terminals 35d are exposed to the wedge base part 35b. The lamp socket 37 made of electrical insulating resin has a bottomed tubular socket main body part 37a and a flange part 37h. An insertion port 37b into which the wedge base part 35b is inserted is formed at a leading end of the socket main body 37a, and four plate spring terminals 37c are fixed to the inside of the socket main body part 37a. Holding the wedge base part 35b between the plate spring terminals 37c fixes the lamp 35 to the lamp socket 37, and electrical condition can be realized by bringing the conduction terminals 35d into contact with the plate spring terminals 37c.

The flange part 37h provided in the socket main body part 37a is provided with a collar part 37e bulging laterally, and an annular skirt part 37f projecting in a direction of tube axis at an outer circumferential end of the collar part 37e. An annular projection part 37g is formed inside the skirt part 37f. On the other hand, an annular groove part 33d into which the projection part 37g of the skirt part 37f is formed on an outer surface of the cylinder part 33b.

Moreover, the flange part 37h formed by the collar part 37e and the skirt part 37f covers the outside of the cylinder part 33b, and the lamp socket 37 is mounted detachably in the lamp housing 33 by recess-and-projection fitting between the projection part 37g of an inner surface 37i of the flange part 37h and the groove part 33d of an outer surface 33f of the cylinder part 33b. In a state in which the lamp socket 37 is mounted in the lamp housing 33, a rear end part 37j of the lamp socket 37 is projected from the cylinder part 33b toward the holder/mirror assembly 15 side. Note that the leading end of the socket main body part 37a is provided with a slip-off prevention pawl part 37k and an annular sealing projection part 37m pressed against an inner surface of the cylinder part 33b. A connecting cord 37n that is caulked and fixed to each plate spring terminal 37c is exposed from the rear end part 37j of the lamp socket 37.

Figure 8:
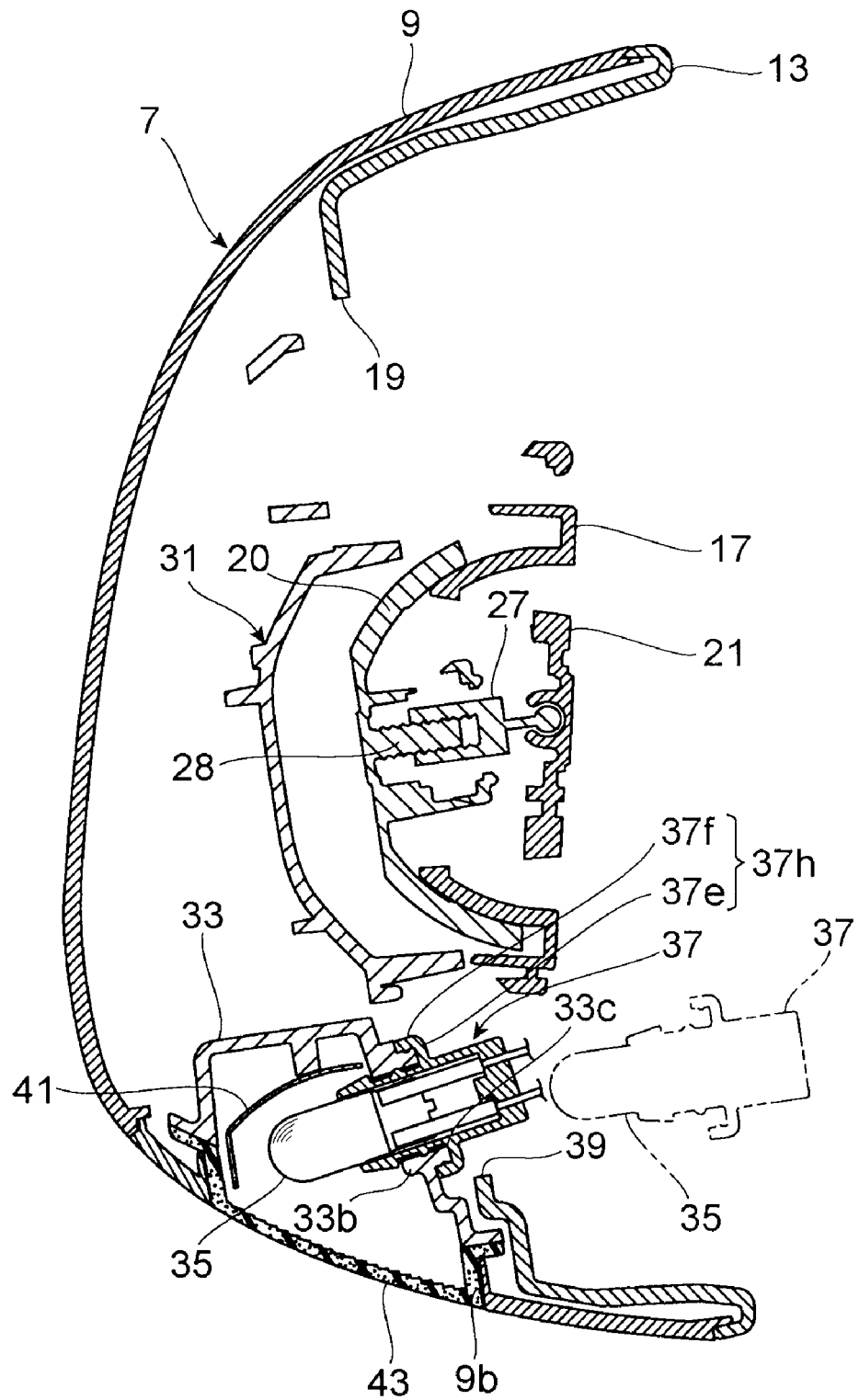
FIG. 8 is a cross-sectional diagram showing a state in which the lamp socket is inserted and extracted to and from the door mirror.

As shown in FIGS. 3, 4 and 8, a socket observation window 39 that is connected to the opening part 19 of the partition plate 13 and allows the insertion of the lamp socket 37 is formed on the partition plate 13 disposed between the lamp housing 33 and the holder/mirror assembly 15. The socket observation window 39 is formed in a size that allows the exposure of substantially the entire surface of the front wall 33a of the lamp housing 33 and exposes the cylinder part 33b (see FIG. 2) when the lamp socket 37 is not attached. The socket observation window 39 is large enough to allow the fingers to hold the rear end part 37j of the lamp socket 37 and is formed in such a size that allows the insertion of two fingers of a normal adult thereto.

Figure 5:
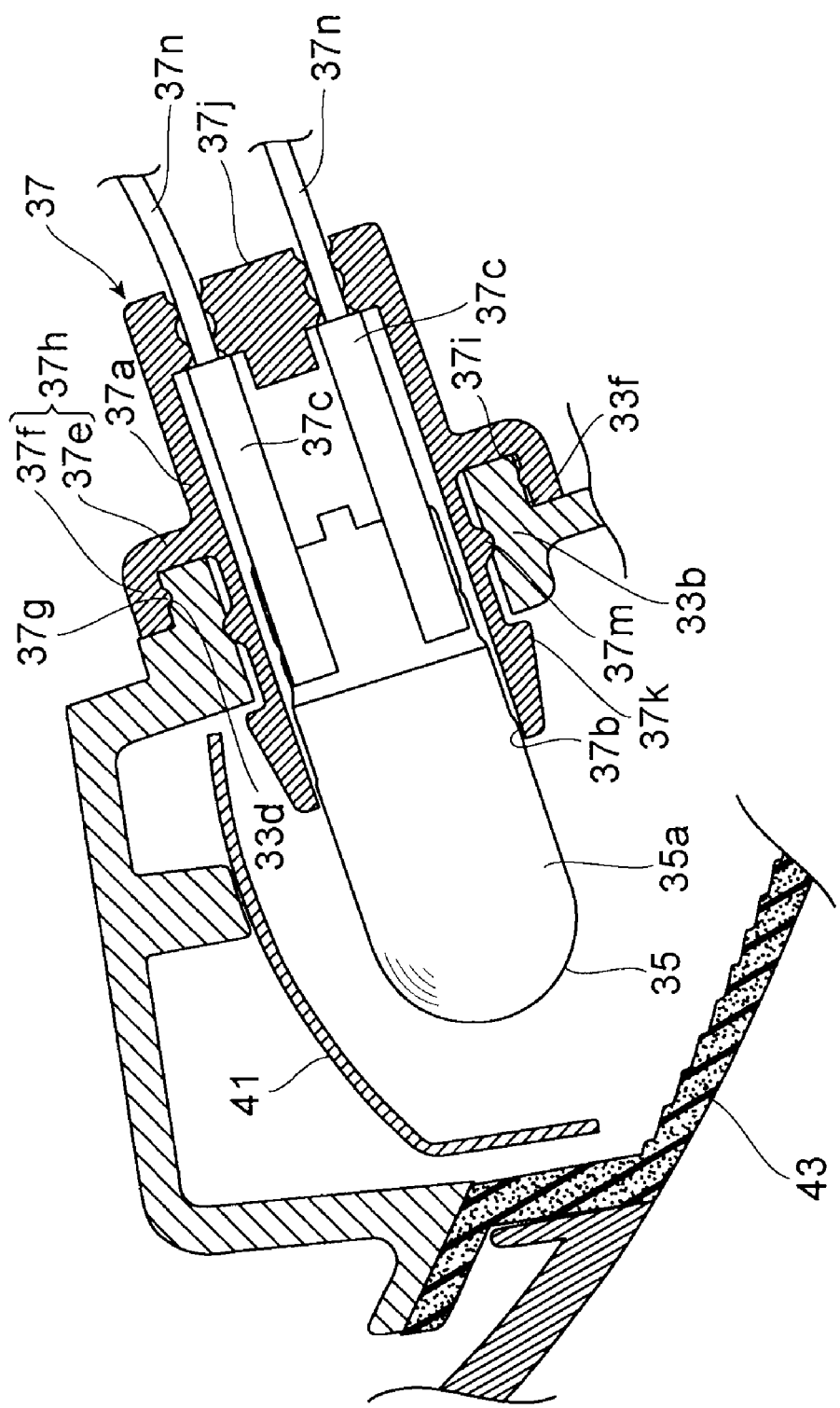
FIG. 5 is an enlarged cross-sectional diagram of a lamp socket and a lamp shown in FIG. 4.
Figure 6:
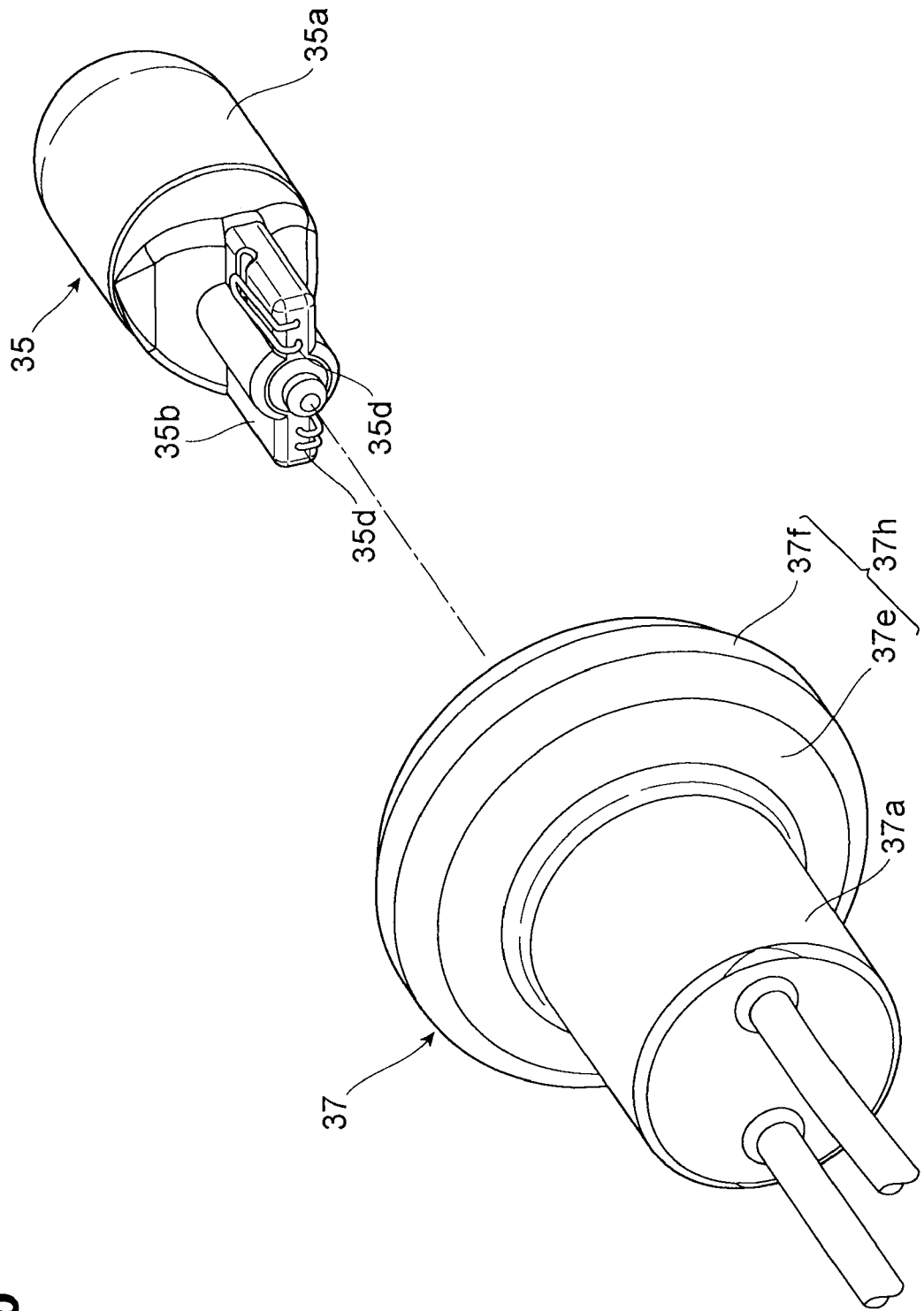
FIG. 6 is a perspective view in which the lamp socket and the lamp are shown from the lamp socket side.
Figure 7:
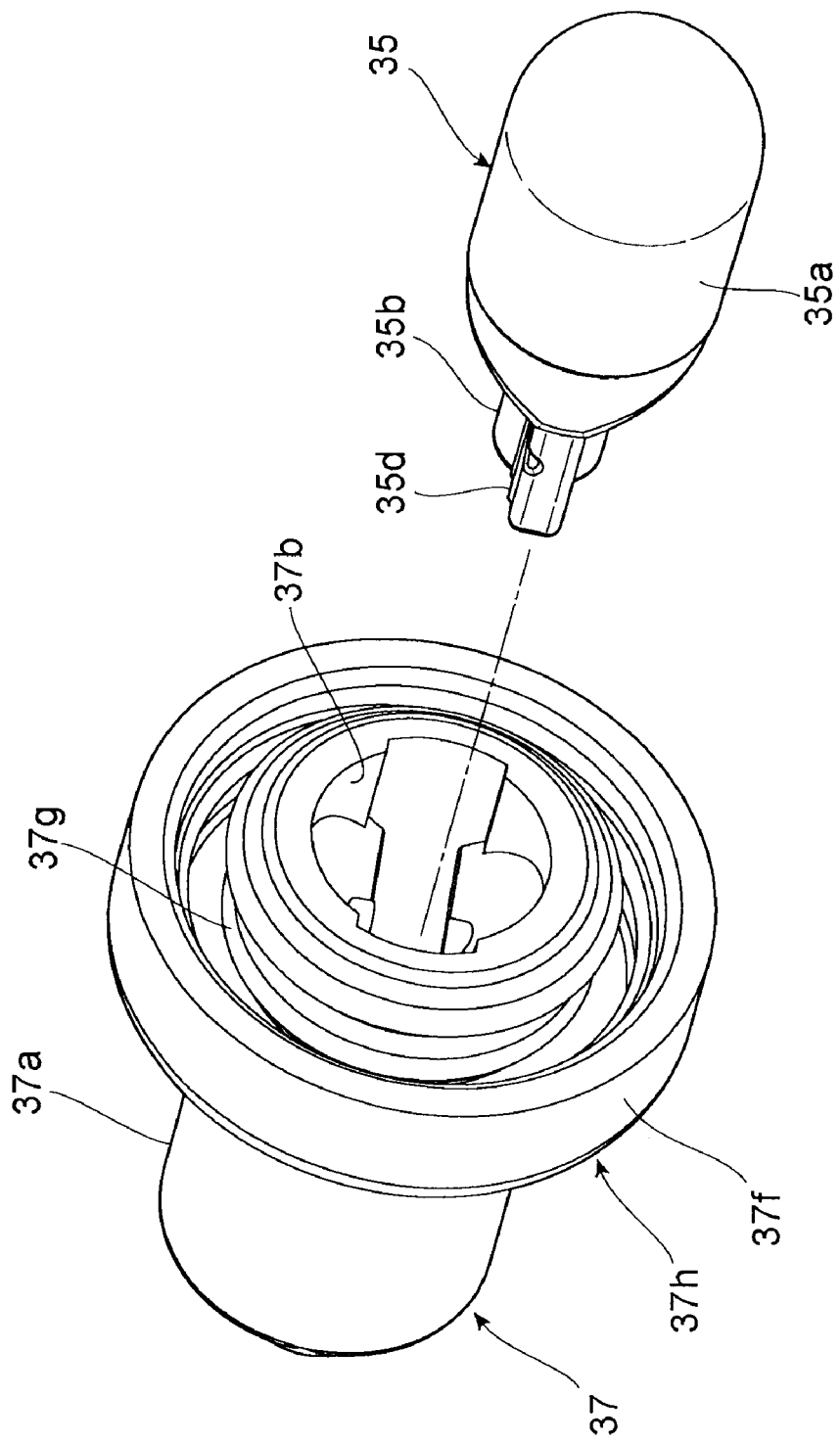
FIG. 7 is a perspective view in which the lamp socket and the lamp are viewed from the lamp side.

As shown in FIGS. 4, 5 and 8, an upper part of the lamp housing 33 is provided with a reflector 41 for reflecting light emitted from the lamp 35, toward the lower side. A lower part of the lamp housing 33 is provided with a lamp window 43 made of transparent acrylic resin or the like. This lamp window 43 is exposed from a window opening 9b formed in a lower part of the casing 9.

With the door mirror 1 described above, a light beam L (see FIG. 1) of the lamp 35 disposed within the lamp housing 33 is emitted from the lamp window 43 at the time of boarding and can illuminate the lower side of the side surface of the door 5. In addition, the lamp 35 is attached to a leading end of the lamp socket 37. The rear end part 37j of the lamp socket 37 is exposed from the cylinder part 33b and projected from the lamp housing 33 toward the holder/mirror assembly 15. Therefore, when the filament of the lamp 35 is cut, the lamp socket 37 can be removed from the pivot plate 17 by strongly pulling the holder/mirror assembly 15 or found simply by tilting the holder/mirror assembly 15 to the limit. Furthermore, the lamp 35 can easily be extracted along with the lamp socket 37, to an operator side. Also when attaching the lamp socket 37, high visibility of the opening part 33c of the cylinder part 33b can be obtained because the lamp attachment opening part 33c of the cylinder part 33b is exposed to the holder/mirror assembly 15 side via the socket observation window 39 formed on the partition plate 13, thereby achieving the door mirror 1 with extremely good workability of lamp replacement.

In addition, because the disassembly and reassembly performed when replacing the lamp can be minimized, parts other than the object of replacement are less likely to be damaged at the time of disassembly and reassembly, and changes in the appearance configuration caused by formation of a gap or the like are also less likely to be caused after the reassembly. Changes in wind noise from the door mirror 1 or rattling of the mirror door 1 are also less likely to occur. In addition, due to the simple lamp 14 replacement, the range of options for a user to choose the lamp 35 is expanded, i.e., a highly luminous lamp 35 can be selected easily, for example.

Moreover, good workability of lamp replacement can be achieved, because the lamp 35 can be removed from the lamp housing 33 simply by pulling the lamp socket 37 out of the lamp housing 33.

The strength of the door mirror body 7 is enhanced by the provision of the partition plate 13. The socket observation window 39 formed on the partition plate 13 has a size that allows the insertion of at least two fingers of the operator thereto. Consequently, extraction and pushing operations can be performed easily by holding the rear end part 37j of the lamp socket 37 with the fingers, whereby the lamp 35 can be replaced further easily.

In addition, because the lamp socket 37 is mounted in the lamp housing 33 by recess-and-projection fitting between the inner surface 37i of the flange part 37h and the outer surface 33f of the cylinder part 33b, the lamp socket 37 can be attached to and detached from the lamp housing 33. Therefore, it is not necessary to either hold the lamp socket by using a spring or consider a decrease in the holding force, for example. Moreover, because the flange part 37h covers the cylinder part 33b from the outside, the entry of water into the lamp housing 33 via the cylinder part 33b can be prevented.

INDUSTRIAL APPLICABILITY

The present invention provides a door mirror in which a lamp can be replaced easily.

The invention claimed is:
1. A door mirror for a vehicle, the door mirror comprising:
a door mirror body configured to be fixed to a door of a vehicle and having an opening;
a mirror assembly detachably attached to close the opening of the door mirror body;
a lamp housing provided within the door mirror body and having a lamp attachment opening portion opening toward the mirror assembly;
a lamp socket configured to hold a lamp and be mounted to the lamp attachment opening portion of the lamp housing;
a lamp window provided in the door mirror body and positioned to project light emitted by the lamp held by the lamp socket to outside the lamp housing,
wherein the lamp socket has a lamp insertion port positioned at a leading end portion of the lamp socket and configured to allow insertion of the lamp into the lamp socket, and the lamp housing has a cylinder portion having the lamp attachment opening portion and an outer end portion projecting toward the mirror assembly such that a rear end portion of the lamp socket is exposed from the lamp attachment opening portion of the lamp housing and projected from the lamp housing toward the mirror assembly.

2. The door mirror according to claim 1, further comprising:
a partition plate disposed between the mirror assembly and the lamp housing; and
a socket observation window which is formed on the partition plate-and through which the lamp socket is inserted,
wherein the socket observation window is formed in a size configured to allow insertion of at least two fingers thereto in order to hold a rear end portion of the lamp socket with the fingers and remove the lamp socket.

3. The door mirror according to claim 2, wherein the lamp socket has a flange portion covering the cylinder portion from the outside, and the flange portion and the cylinder portion are configured such that the lamp socket is mounted in the lamp housing by recess-and-projection fitting between an inner surface of the flange portion and an outer surface of the cylinder portion.

4. The door mirror according to claim 1, wherein the lamp socket has a flange portion covering the cylinder portion from the outside, and the flange portion and the cylinder portion are configured such that the lamp socket is mounted in the lamp housing by recess-and-projection fitting between an inner surface of the flange portion and an outer surface of the cylinder portion.

5. The door mirror according to claim 1, wherein the lamp socket has a flange portion covering the cylinder portion from the outside, and the flange portion and the cylinder portion are configured such that the lamp socket is mounted in the lamp housing by recess-and-projection fitting.

6. The door mirror according to claim 1, wherein the lamp socket has a flange portion covering the cylinder portion from the outside, the flange portion and the cylinder portion are configured such that the lamp socket is mounted in the lamp housing by recess-and-projection fitting, and the lamp socket has a pawl portion configured to prevent slip-off at the lamp insertion port of the lamp socket.

7. The door mirror according to claim 1, wherein the lamp socket has a flange portion covering the cylinder portion from the outside, the flange portion and the cylinder portion are configured such that the lamp socket is mounted in the lamp housing by recess-and-projection fitting, and the flange portion of the lamp socket has a collar portion and an annular skirt portion projecting in a direction of an axis of the lamp at an outer circumferential end portion of the collar portion.

8. The door mirror according to claim 1, wherein the lamp socket has a flange portion covering the cylinder portion from the outside, the flange portion and the cylinder portion are configured such that the lamp socket is mounted in the lamp housing by recess-and-projection fitting, the cylinder portion of the lamp housing has a groove portion, and the flange portion of the lamp socket has a projection portion configured to engage with the groove portion of the cylinder portion when the lamp socket is mounted to the lamp housing.

9. A door mirror for a vehicle, the door mirror comprising:
- a door mirror body configured to be fixed to a door of a vehicle and having an opening;
- a mirror assembly detachably attached to close the opening of the door mirror body;
- a lamp housing provided within the door mirror body and having a lamp attachment opening portion opening toward the mirror assembly;
- a lamp socket configured to hold a lamp and be mounted to the lamp attachment opening portion of the lamp housing;
- a lamp window provided in the door mirror body and positioned to project light emitted by the lamp held by the lamp socket to outside the lamp housing,
- wherein the lamp socket has a lamp insertion port positioned at a leading end portion of the lamp socket and configured to allow insertion of the lamp into the lamp socket, and the lamp housing has a cylinder portion having the lamp attachment opening portion and an outer end portion projecting toward the mirror assembly such that a rear end portion of the lamp socket is exposed from the lamp attachment opening portion of the lamp housing and projected from the lamp housing toward the mirror assembly, the lamp socket has a flange portion covering the cylinder portion from the outside, and the flange portion and the cylinder portion are configured such that the lamp socket is mounted in the lamp housing by recess-and-projection fitting between an annular inner surface of the flange portion and an outer surface of the cylinder portion.

10. The door mirror according to claim 9, further comprising:
- a partition plate disposed between the mirror assembly and the lamp housing; and
- a socket observation window which is formed on the partition plate-and through which the lamp socket is inserted,
- wherein the socket observation window is formed in a size configured to allow insertion of at least two fingers thereto in order to hold a rear end portion of the lamp socket with the fingers and remove the lamp socket.

11. The door mirror according to claim 9, wherein the lamp socket has a pawl portion configured to prevent slip-off at the lamp insertion port of the lamp socket.

12. The door mirror according to claim 9, wherein the flange portion of the lamp socket has a collar portion and an annular skirt portion projecting in a direction of an axis of the lamp at an outer circumferential end portion of the collar portion.

13. The door mirror according to claim 9, wherein the cylinder portion of the lamp housing has a groove portion, and the flange portion of the lamp socket has a projection portion configured to engage with the groove portion of the cylinder portion when the lamp socket is mounted to the lamp housing.

* * * * *